Dec. 19, 1944.　　　　C. S. ASH　　　　2,365,617
DUAL WHEEL ASSEMBLY
Filed July 23, 1942
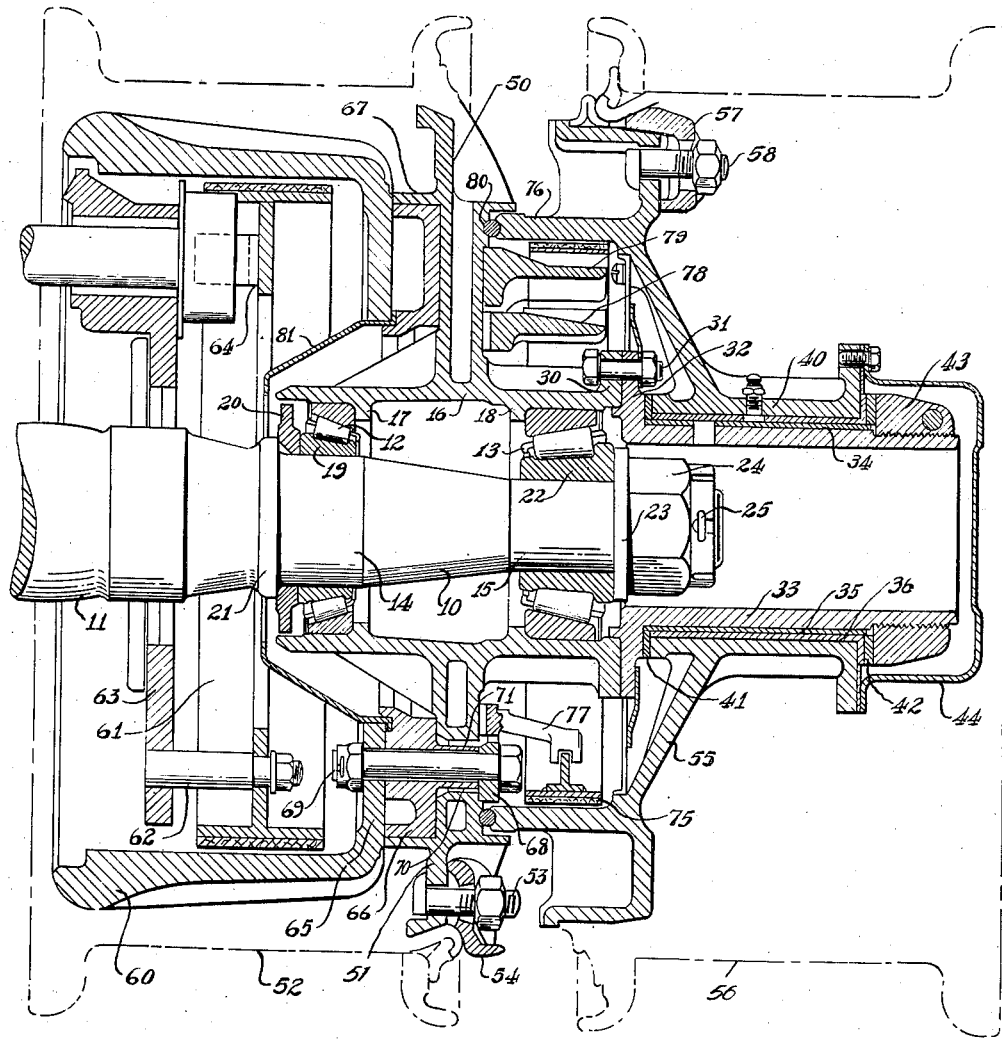
INVENTOR
C. S. Ash
BY
Hobart N. Durham
ATTORNEY Patented Dec. 19, 1944

2,365,617

UNITED STATES PATENT OFFICE 2,365,617

DUAL WHEEL ASSEMBLY

Charles S. Ash, Milford, Mich.

Application July 23, 1942, Serial No. 452,005

5 Claims. (Cl. 301—36)

The present invention relates to dual wheel assemblies and more particularly to improvements in hub and bearing structures for dual wheel assemblies in which the individual wheels are independently rotatable.

Objects and advantages of the invention will be set forth in part hereinafter and in part will be obvious herefrom, or may be learned by practice with the invention, the same being realized and attained by means of the instrumentalities and combinations pointed out in the appended claims.

The invention consists in the novel parts, constructions, arrangements, combinations, and improvements herein shown and described.

The accompanying drawing, referred to herein and constituting a part hereof, illustrates one embodiment of the invention, and together with the description, serve to explain the principles of the invention.

It is an object of the present invention to provide a dual wheel assembly in which the two wheels are independently rotatable with a novel and improved hub and bearing structure. A further object of the invention is to provide an independently rotatable dual wheel assembly with a sturdy and compact hub and bearing structure and one that is of relatively small overall diameter. Still another object is the provision of a hub and bearing structure of these characteristics and for such wheel assemblies which is easily and efficiently assembled and disassembled, and which has no massive and hard to produce parts. The invention further provides a well balanced and long wearing hub and bearing structure for differential dual wheel assemblies and a structure with which safe, compact and efficient individual brakes may be provided for the wheels of the assembly. Still another object is to provide a sturdy, efficient and compact differential dual wheel assembly which may be mounted on the vehicle axle by standard bearings.

The drawing is an axial cross sectional view of an independently rotatable dual wheel assembly in which the present invention is embodied.

In the illustrative and presently preferred embodiment of the invention shown by way of illustration in the accompanying drawing there is provided a vehicle axle at each end of which is mounted a pair of independently rotatable wheels. The hub for the inner wheel of each dual wheel assembly is mounted for free rotation upon a pair of spaced apart anti-thrust and anti-friction bearings mounted on the axle end, and the hub has a reduced outwardly axially extending extension removably secured to its outer end. The hub extension extends outwardly beyond the end of the axle and has a finished outer cylindrical surface or journal, the outer diameter of the journal being substantially the same as the inner diameter of the hub mounted on the bearings. The hub for the outer wheel of the assembly is journalled on the extension journal for free relative rotation and is positioned in substantially cylindrical alignment with the inner wheel hub, being axially outwardly displaced from the pair of bearings on the axle end. A pair of cylindrical inter-hub bushings are mounted on the extension journal between the extension and the outer wheel hub, and thrust bearing means are provided between the outer wheel hub and the inner wheel hub extension.

Wheels are provided one for each wheel hub and each wheel is provided with a tire carrying rim suitably demountably mounted thereon. The outer bearing of the pair of bearings upon which the inner wheel hub is mounted lies in the plane of the distance between adjacent edges of the tire rims, that is, the centerline between road engaging portions of the wheels of the assembly passes closely adjacent or intersects the outer bearing, and this bearing may be of somewhat larger and sturdier construction than the inner bearing of the pair. The journal of the inner wheel hub extension upon which the outer wheel hub is journalled lies in the plane of the rim for the outer wheel.

Braking means are provided for the assembly for simultaneously applying braking effort to each wheel, and as illustratively shown comprise a brake drum mounted on the inner side of the inner wheel. The brake drum is capable of limited rotary movement with respect to its wheel upon frictional engagement by its brake shoe when the brakes are applied, and this movement expands a clutching member or shoe on the outer side of the inner wheel into frictional engagement with a brake drum on the outer wheel, whereby the two wheels are clutched together for correlative rotation as braking effort is applied to the inner wheel.

It will be understood that the foregoing general description and the following detailed description as well are exemplary and explanatory of the invention but are not restrictive thereof.

Referring now in detail to the illustrative embodiment of the present invention as shown in the accompanying drawing, there is provided an axle end 10 at the end of a dead or trailing vehicle axle 11, and it is understood that the differential dual wheel assembly as hereinafter described is duplicated on the other end of the axle. A pair of spaced apart taper roller bearings 12, 13 is seated on the finished seats 14, 15 respectively of the axle end 10, and these bearings may be the standard spindle bearings usually provided for vehicle wheels, the outer bearing 13 being of somewhat larger and sturdier construction than the inner bearing 12.

The cylindrical inner wheel hub 16 is mounted for free rotation upon the pair of bearings 12, 13, and has the inwardly radially extending shoulders 17, 18 to abut against the outer races of bearings 12 and 13 respectively, insuring the spacing of the bearings and the secure positioning of the inner wheel hub. The inner race 19 of inner bearing 12 abuts against a spacing ring 20 which in turn abuts against the outwardly extending flange 21 of the axle end. The inner race 22 of the outer bearing 13 abuts against a flat washer 23 on the axle end, the assembly being securely held in place by a castellated nut 24 threaded on the axle end and secured by a cotter key 25.

At its outer end the inner wheel hub 16 has an outwardly radially extending annular flange 30, and to this flange by means of bolts 31 is removably secured an abutting radially outwardly extending flange portion 32 of the reduced cylindrical hub extension 33. The extension has a finished outer cylindrical surface or journal 34, and this surface is substantially of the same diameter as the bore of the inner hub 16. A pair of cylindrical anti-friction bushings 35, 36 are positioned over the journal 34, and these bushings may be made of hardened steel to eliminate all wear rather than of fiber or otherwise as is conventional, due to the relatively small diameter of hub extension 33. The hub 40 for the outer wheel is journalled on the finished surface or journal 34 of the extension 33 (bushings 35, 36 being interposed) in substantially cylindrical alignment with the inner hub 16, and the hub is thereby mounted for free rotation about axle end 10 and is independently rotatable with respect to the inner wheel hub 16. Flat thrust washers 41, 42 are positioned at the inner and outer ends respectively of hub 40 over the extension 33, and a locking nut 43 is threaded on the end of the extension securely positioning the outer hub and extension assembly. A hub cap 44 secured to the outer hub 40 is provided to protect the assembly from dust and weather.

The inner wheel 50 is formed integral with its hub 16 at the central portion of the latter between the taper bearings 12 and 13, and is provided at its outer periphery with spokes 51 upon which is demountably mounted the inner rim 52 by means of rim mounting bolts 53 and rim lugs 54. The outer wheel 55 is formed integral with its hub 40 and carries tire rim 56 demountably mounted thereon by means of lugs 57 and rim mounting bolts 58.

Although the present invention has been shown and described as applied to a dual wheel assembly in which demountable-rim type wheels are used, it will be apparent that the invention is equally novel and useful in dual wheel assemblies where the demountable-at-the-hub type of wheel is used.

It will be noted that in the illustrative embodiment of the invention shown and described the outer and larger taper bearing 13 lies in the plane of the distance between adjacent edges of rims 52 and 56 and that the centerline between the rims (and thus the tires mounted on the rims) will thus lie closely adjacent this bearing in order to assure a balanced and long wearing bearing structure. It will further be noted that the journal of the outer wheel hub 40 upon extension 33 lies in the plane of the outer rim 56, so that there is no overhanging or unbalanced load placed on this journal bearing. At the same time all bearings for the individually rotatable wheels are of relatively small diameter and compact, allowing the use of stronger and better wear-resisting materials for the inter-hub bushings between members 40 and 33, and the provision of adequate, compact and safe braking means for the assembly.

The braking means for the wheel assembly of the present invention may be any of several suitable types of brakes, but in the accompanying drawing are shown brakes of a preferred form which are in general those shown and described in my Patent No. 2,192,023.

A brake drum 60 for the inner wheel is adapted to be frictionally engaged by a pair of internally expanding brake shoes 61 each of which is pivotally mounted on a pin 62 extending from anchor member 63 which is secured to axle 11. The brake is applied in a conventional manner by the vehicle operator by turning the operating cam 64 positioned between the ends of the pair of shoes 61.

The brake drum 60, when frictionally engaged by the brake shoes 61, is allowed a limited rotary movement with respect to the inner wheel 50 whereby the outer wheel 55 is clutched to the inner wheel for simultaneous braking action. As embodied, the outer annular flange portion 65 of brake drum 60 abuts against and seats, at its inner periphery, on the annular drum carrier 66 which is mounted for rotary motion within and on an inwardly axially extending cylindrical portion 67 of the wheel 50. A flat annular plate 68 is positioned against the outer face of wheel 50 opposite drum carrier 66, and bolts 69 extending through the members 65, 66 and 68 securely hold said members together for correlative rotary motion and the members 66 and 68 against opposite faces of wheel 50. The bolts 69 extend through arcuate apertures 70 in the wheel 50, lying within bushed bosses 71 integral with carrier 66.

A clutch or brake shoe member 75 is positioned within a brake drum 76 extending inwardly from the outer wheel 55, and the clutch member is supported as by a bracket 77 secured to inner wheel 50. The adjacent ends of clutch member 75 are radially flared to abut against an arm 78 extending from and fixed to the inner wheel 50, and also against another arm 79 which is secured to annular plate 68. Thus, as limited rotary movement is allowed to drum 60 upon application of the brakes, movement is transmitted to plate 68 and arm 79, which expands the clutch member 75 into frictional engagement with drum 76 of the outer wheel. The inner and outer wheels are thereby clutched together for correlative rotation and simultaneous braking effort.

A sealing ring 80 may be positioned between the drum 76 of the outer wheel and inner wheel 80 to seal the space between the wheels for the protection of the braking means, and a dished plate 81 may be provided at the inner end of hub 16 for the protection of the bearings and brakes.

The invention in its broader aspects is not limited to the specific mechanisms shown and described but departures may be made there-from within the scope of the accompanying claims without departing from the principles of the invention and without sacrificing its chief advantages.

What I claim is:

1. In a dual wheel assembly, in combination, an axle end, bearing means on the axle end, a cylindrical hub rotatably mounted on said bearing means, a cylindrical member secured to the outer end of said hub axially outwardly beyond said bearing means, and another hub rotatably journalled on the cylindrical member.

2. In a dual wheel assembly, in combination, an axle end, bearing means on the axle end, a cylindrical hub rotatably mounted on said bearing means, a cylindrical member removably secured to the outer end of said hub axially outwardly beyond said bearing means, and another hub rotatably journalled on the cylindrical member.

3. In a dual wheel assembly, in combination, an axle end, bearing means on the axle end, a cylindrical hub rotatably mounted on said bearing means, a cylindrical member secured to the outer end of said hub axially outwardly beyond said bearing means, a second hub rotatably journalled on the cylindrical member, a wheel mounted on the first hub, and an inwardly dished wheel mounted adjacent the inner end of the second hub.

4. In a dual wheel assembly, in combination, an axle end, a cylindrical hub, an anti-friction bearing at either end of said hub rotatably mounting said hub on the axle end, a cylindrical member secured to the outer end of said hub axially outwardly beyond the outermost bearing, a second hub rotatably journalled on the cylindrical member, a wheel mounted centrally on the first hub, and a second wheel mounted adjacent the inner end of said second hub.

5. In a dual wheel assembly, in combination, an axle end, a cylindrical hub, an anti-friction bearing at the inner end of the hub and a second larger anti-friction bearing at the outer end of said hub said bearings rotatably mounting the hub on the axle end, a cylindrical member secured to the outer end of said hub axially outwardly beyond said second bearing, a second hub rotatably journalled on said cylindrical member, a wheel mounted centrally on the first hub, and a second wheel mounted adajacent the inner end of said second hub.

CHARLES S. ASH.